United States Patent
Kim et al.

(10) Patent No.: US 10,418,635 B2
(45) Date of Patent: Sep. 17, 2019

(54) ELECTROLYTIC COPPER FOIL FOR LITHIUM SECONDARY BATTERY AND LITHIUM SECONDARY BATTERY COMPRISING THE SAME

(71) Applicant: LS Mtron Ltd., Anyang-si, Gyeonggi-do (KR)

(72) Inventors: Seung-Min Kim, Osan-si (KR); Soo-Yeol Kim, Jeongeup-si (KR); Dae-Young Kim, Yongin-si (KR); Jeong-Gil Lee, Seoul (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/315,774

(22) PCT Filed: May 11, 2016

(86) PCT No.: PCT/KR2016/004925
§ 371 (c)(1),
(2) Date: Dec. 2, 2016

(87) PCT Pub. No.: WO2016/204405
PCT Pub. Date: Dec. 22, 2016

(65) Prior Publication Data
US 2018/0102545 A1    Apr. 12, 2018

(30) Foreign Application Priority Data

Jun. 18, 2015  (KR) .................. 10-2015-0086856
Apr. 22, 2016  (KR) .................. 10-2016-0049472

(51) Int. Cl.
*H01M 4/66*        (2006.01)
*H01M 10/05*       (2010.01)
(Continued)

(52) U.S. Cl.
CPC ............ *H01M 4/661* (2013.01); *H01M 4/66* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 9,603,245 B2 * | 3/2017 | Suzuki | ............ C22F 1/08 |
| 2007/0026245 A1 * | 2/2007 | Okamoto | ............ B32B 15/08 |
| | | | 428/458 |

(Continued)

FOREIGN PATENT DOCUMENTS

| | | |
|---|---|---|
| CN | 101669237 A | 3/2010 |
| JP | 2000182623 A | 6/2000 |

(Continued)

OTHER PUBLICATIONS

Search Report for International Application No. PCT/KR2016/004925.

(Continued)

*Primary Examiner* — Jonathan Crepeau
*Assistant Examiner* — Angela J Martin
(74) *Attorney, Agent, or Firm* — K&L Gates LLP

(57) ABSTRACT

An electrolytic copper foil for a lithium secondary battery, which is applied as a negative electrode current collector of a lithium secondary battery, wherein after a thermal treatment at 300° C. for 30 minutes, the electrolytic copper foil for a lithium secondary battery has an elongation of 5% to 30%.

5 Claims, 1 Drawing Sheet

(51) Int. Cl.
_H01M 10/052_ (2010.01)
_H01M 4/02_ (2006.01)

(56) References Cited

U.S. PATENT DOCUMENTS

| | | | |
|---|---|---|---|
| 2008/0176144 A1* | 7/2008 | Iwama | H01M 4/134 |
| | | | 429/338 |
| 2010/0136434 A1 | 6/2010 | Hanafusa | |
| 2014/0017564 A1* | 1/2014 | Suzuki | C22F 1/08 |
| | | | 429/211 |
| 2014/0030591 A1* | 1/2014 | Kohiki | C25D 1/04 |
| | | | 429/211 |
| 2014/0291156 A1 | 10/2014 | Ezura et al. | |
| 2016/0013493 A1 | 1/2016 | Shinozaki | |

FOREIGN PATENT DOCUMENTS

| | | | | | |
|---|---|---|---|---|---|
| JP | 2013-001982 | * | 1/2013 | ............... | C22C 9/00 |
| JP | 2013-151730 | * | 8/2013 | ............... | C22C 9/00 |
| JP | 2013151730 A | | 8/2013 | | |
| JP | 2014009365 A | | 1/2014 | | |
| JP | 2014-101581 A | | 6/2014 | | |
| KR | 10-2009-0125823 A | | 12/2009 | | |
| KR | 10-2014-0007507 A | | 1/2014 | | |
| KR | 10-2014-0084216 A | | 7/2014 | | |
| KR | 10-2015-0062227 A | | 6/2015 | | |
| TW | 201437435 A | | 10/2014 | | |
| WO | 2013/002275 A1 | | 1/2013 | | |
| WO | 2014002996 A1 | | 1/2014 | | |

OTHER PUBLICATIONS

Written Opinion for International Application No. PCT/KR2016/004925.
European Search Report for related European Application No. 16811818; dated Mar. 26, 2018; (8 pages).
Japanese Office Action for related Japanese Application No. 2017-565096; dated Jan. 8, 2019; (5 pages).
Taiwanese Office Action for related Taiwanese Application No. 105118807; dated Aug. 17, 2018; (4 pages).
Chinese Office Action for related Chinese Application No. 201680000866.X; dated Sep. 5, 2018; (7 pages).

* cited by examiner

ELECTROLYTIC COPPER FOIL FOR LITHIUM SECONDARY BATTERY AND LITHIUM SECONDARY BATTERY COMPRISING THE SAME

CROSS-REFERENCE TO RELATED APPLICATIONS

The present application claims priority to Korean Patent Application No. 10-2015-0086856, filed Jun. 18, 2015, and Korean Patent Application No. 10-2016-0049472, filed Apr. 22, 2016, in the Republic of Korea, the disclosures of which are incorporated herein by reference.

BACKGROUND OF THE INVENTION

1. Filed of the Invention

The present disclosure relates to an electrolytic copper foil for a lithium secondary battery and a lithium secondary battery comprising the same, and more particularly, to an electrolytic copper foil for a lithium secondary battery and a lithium secondary battery comprising the same, which has an elongation over a certain level after a thermal history is applied during an actual lithium secondary battery manufacturing process.

2. Description of Related Art

At present, graphite-based materials are commonly used as a negative electrode material of a lithium secondary battery, but the graphite-based negative electrode materials have a small battery capacity per weight and thus are not capable of coping with the demands on larger mobile battery capacity.

In order to cope with the demands on larger battery capacity, a silicon-based negative electrode active material is actively investigated as a next-generation negative electrode material, because the silicon-based negative electrode active material has a much greater capacity per weight in comparison to the silicon-based negative electrode active material.

However, if an Si-based negative electrode material is used as the negative electrode active material, the negative electrode is seriously swelled, and thus if the Si-based negative electrode material is commercially used for a copper foil, during a charging/discharging process, the negative electrode current collector may be torn, which may greatly deteriorating the charging/discharging efficiency.

In addition, if the Si-based negative electrode material is used, a polyimide-based resin capable of controlling the swelling of the negative electrode material is used as a binder.

In this case, since the negative electrode material coated on a copper foil is dried at a high temperature of about 300° C., an electrolytic copper foil for a lithium secondary battery serving as a negative electrode current collector of the lithium secondary battery should have suitable properties as an electrolytic copper foil for a lithium secondary battery, even though a thermal history is applied at a high temperature of about 300° C. for a predetermined time.

SUMMARY

The present disclosure is directed to providing an electrolytic copper foil for a lithium secondary battery, which may maintain excellent properties over a certain level, even after a thermal history is applied at a high temperature.

However, the technical objects to be accomplished by the present disclosure are not limited to the above, and other objects not mentioned above may be clearly understood from the following detailed description.

After the researches to accomplish the above object, the inventors of the present disclosure have found that if an electrolytic copper foil for a lithium secondary battery to which a thermal history is applied at a high temperature has an elongation over a certain level, even though the negative electrode material is swelled while the secondary battery is being charged or discharged, the negative electrode current collector is not torn.

The electrolytic copper foil for a lithium secondary battery according to an embodiment of the present disclosure is applied as a negative electrode current collector of a lithium secondary battery, and after a thermal treatment at 300° C. for 30 minutes, the electrolytic copper foil for a lithium secondary battery has an elongation of 5% or above.

The electrolytic copper foil for a lithium secondary battery may have an elongation of 5% to 30%, after a thermal treatment at 300° C. for 30 minutes.

The electrolytic copper foil for a lithium secondary battery may have a breaking strength of 19 kgf/mm$^2$ to 26 kgf/mm$^2$, after a thermal treatment at 300° C. for 30 minutes.

The electrolytic copper foil for a lithium secondary battery may have a breaking strength ratio ((breaking strength/yield strength)×100) of 110% to 165%, after a thermal treatment at 300° C. for 30 minutes.

The electrolytic copper foil for a lithium secondary battery may have an anti-corrosion layer containing at least one of chrome (Cr), silane compound and nitride compound, on both surfaces thereof.

The electrolytic copper foil for a lithium secondary battery may have a thickness of 3 μm to 30 μm.

Both surfaces of the electrolytic copper foil for a lithium secondary battery may have a surface roughness of 3.5 μm or less on the basis of Rz.

Meanwhile, a lithium secondary battery according to an embodiment of the present disclosure is manufactured by applying the electrolytic copper foil for a lithium secondary battery, described above, as a negative electrode current collector.

Advantageous Effects

According to an embodiment of the present disclosure, it is possible to provide an electrolytic copper foil for a lithium secondary battery and a lithium secondary battery comprising the same, which may maintain excellent quality after a high-temperature thermal history is applied, which must be performed during an actual lithium secondary battery manufacturing process.

BRIEF DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION OF THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an electrolytic copper foil for a lithium secondary battery according to an embodiment of the present disclosure will be described with reference to FIG. 1.

Figure 1:
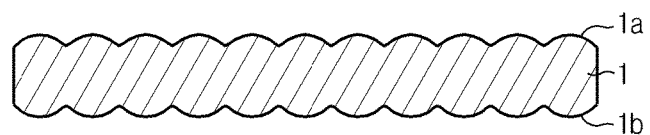
FIG. 1 is a cross-sectional view showing an electrolytic copper foil for a lithium secondary battery according to an embodiment of the present disclosure.

FIG. 1 is a cross-sectional view showing an electrolytic copper foil for a lithium secondary battery according to an embodiment of the present disclosure.

The electrolytic copper foil 1 for a lithium secondary battery according to an embodiment of the present disclosure, shown in FIG. 1, may be used as a negative electrode current collector of a lithium secondary battery. In other words, in the lithium secondary battery, the negative electrode current collector coupled to a negative electrode active material may employ the electrolytic copper foil.

Meanwhile, when manufacturing a lithium secondary battery, a positive electrode current collector coupled to a positive electrode active material generally employs a foil made of aluminum (Al).

Accordingly, the present disclosure is based on a case where the electrolytic copper foil 1 for a lithium secondary battery corresponds to a negative electrode current collector applied to the lithium secondary battery.

The electrolytic copper foil for a lithium secondary battery according to an embodiment of the present disclosure has an elongation of about 5% or above, when being measured after a thermal treatment at a high temperature of about 300° C. during about 30 minutes. Here, 300° C. corresponds to a temperature applied during a drying process, after the electrolytic copper foil is coated with a negative electrode active material while manufacturing an actual lithium secondary battery (a lithium secondary battery in which a Si-based negative electrode material is applied and a polyimide-based resin is used as a binder to control swelling of the Si-based negative electrode material). Here, it is possible to prevent the electrolytic copper foil from being torn at a secondary battery charging/discharging test, only when the electrolytic copper foil exhibits an elongation of about 5% or above after the thermal treatment.

In addition, the electrolytic copper foil 1 for a lithium secondary battery according to an embodiment of the present disclosure may be manufactured to exhibit an elongation of about 30% or less, after a thermal treatment is applied at a high temperature of about 300° C. during about 30 minutes.

If the electrolytic copper foil 1 for a lithium secondary battery exhibits an elongation greater than about 30% after the thermal treatment, a stain rate of the electrolytic copper foil increases too great during a battery manufacturing process, and thus wrinkles are generated at the electrode while the electrode is being transported in a battery manufacture line, after the Si-based negative electrode material is coated to the electrolytic copper foil and dried.

Meanwhile, the breaking strength exhibited by the electrolytic copper foil 1 for a lithium secondary battery after the thermal treatment may be limited to a range of about 19 kgf/mm$^2$ to 26 kgf/mm$^2$.

If the electrolytic copper foil 1 for a lithium secondary battery exhibits a breaking strength less than about 19 kgf/mm$^2$ after the thermal treatment, the electrolytic copper foil may be torn since the electrolytic copper foil may not endure a tensile stress applied when the electrolytic copper foil and/or the electrode is being wound.

On the contrary, if the electrolytic copper foil 1 for a lithium secondary battery exhibits a breaking strength greater than about 26 kgf/mm$^2$ after the thermal treatment, wrinkles may be generated at the electrolytic copper foil while the electrode is being transported in a battery manufacture line after the Si-based negative electrode material is coated and dried, since the electrolytic copper foil has small particles and the elongation is lowered.

In addition, a breaking strength ratio exhibited by the electrolytic copper foil 1 for a lithium secondary battery after the thermal treatment, namely a value obtained by multiplying 100 by a value obtained by dividing a breaking strength by yield strength, may be controlled to a range of about 110% to 165%.

When manufacturing an electrolytic copper foil, it is substantially technically impossible to have a breaking strength ratio less than about 110% after a thermal treatment at about 300° C. Also, if the breaking strength ratio after the thermal treatment is greater than 165%, the electrolytic copper foil may be easily deformed to generate wrinkles while the electrode is being transported after the Si-based negative electrode material is coated and dried.

As described above, the electrolytic copper foil for a lithium secondary battery according to an embodiment of the present disclosure may have suitably controlled properties during its manufacturing process so as to ensure reliability during a lithium secondary battery manufacturing process even after a thermal history is applied at a high temperature of about 300° C.

Meanwhile, both surfaces of the electrolytic copper foil for a lithium secondary battery according to an embodiment of the present disclosure may have surface roughness of about 0.2 μm to 3.5 μm, on the basis of Rz (ten-point average roughness).

If the surface roughness is less than about 0.2 μm, the adhesion between the electrolytic copper foil and the active material may deteriorate. If the adhesion between the electrolytic copper foil and the active material deteriorates as above, the active material is more likely to be separated while the lithium secondary battery is in use.

If the surface roughness is greater than about 3.5 μm, the active material may not be uniformly coated on the surface 1a of the electrolytic copper foil due to high roughness, thereby deteriorating an adhesion force. If the active material is not uniformly coated as above, the manufactured lithium secondary battery may have a deteriorated discharge capacity retention rate.

In addition, the electrolytic copper foil for a lithium secondary battery may have a thickness of about 3 μm to 30 μm.

If the electrolytic copper foil has a thickness of less than about 3 μm which is too small, during a battery manufacturing process, the electrolytic copper foil may not be easily handled, thereby deteriorating workability. If the electrolytic copper foil has a thickness greater than about 30 μm, when the electrolytic copper foil is used as a current collector, the volume of the current collector may increase due to the thickness, which makes it difficult to manufacture a high-capacity battery.

Figure 2:
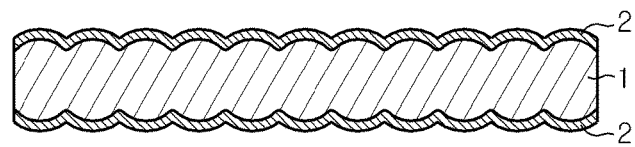
FIG. 2 is a cross-sectional view showing an anti-corrosion layer formed at a surface of the electrolytic copper foil for a lithium secondary battery according to an embodiment of the present disclosure.
Figure 3:
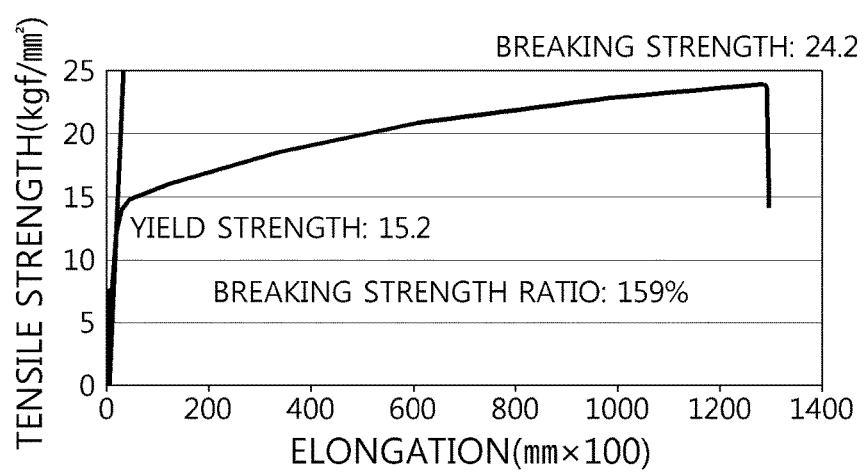
FIG. 3 is a graph showing properties after a high-temperature thermal history is applied to the electrolytic copper foil for a lithium secondary battery according to an embodiment of the present disclosure.

Meanwhile, referring to FIG. 2, the electrolytic copper foil 1 for a lithium secondary battery according to an embodiment of the present disclosure may further include an anti-corrosion layer 2 formed on the surface 1a thereof.

The anti-corrosion layer 2 is selectively formed on the surface 1a of the electrolytic copper foil for the corrosion control of the electrolytic copper foil 1 for a lithium secondary battery, and may contain at least one of chrome (Cr), silane compound and nitride compound.

The anti-corrosion layer 2 may also play a role of giving heat resistance and/or enhanced coupling with the active material to the electrolytic copper foil 1 for a lithium secondary battery, in addition to the corrosion control.

Examples and Comparative Examples

Hereinafter, after preparing electrolytic copper foils according to examples satisfying features of the present disclosure as well as comparative examples, properties of the electrolytic copper foils according to the examples and the comparative examples are compared to investigate the features of the present disclosure more clearly.

An electrolytic copper foil for a lithium secondary battery according to each of the examples and the comparative examples is prepared using an apparatus for electrolytic deposition which includes a rotating drum and a positive electrode plate located at a predetermined interval from the drum, in an electrolytic bath.

During a foil preparing process using such an apparatus for electrolytic deposition, in order to prepare an electrolytic copper foil for a lithium secondary battery according to an example of the present disclosure, an electrolyte includes a restricted amount of concentration less than 1 g/L by limiting a TOC concentration to 1 g/L or less in copper sulphate containing 50 to 100 g/L of copper and 50 to 150 g/L of sulfuric acid. For this, in order to maintain cleanliness of the electrolyte according to the example of the present disclosure, before a copper wire (Cu wire) is put into sulfuric acid, sulfuric acid is cleaned by removing impurities or the like, and also water and air are put into the electrolyte to maintain as a clean solution.

In addition, a current density applied during electrolytic deposition of the electrolytic copper foil according to the example is in the range of 30 ASD to 80 ASD, and the temperature of the electrolyte is adjusted to the range of 40 to 70° C. Hydroxyethyl cellulose (HEC), 3-(Benzothiazolyl-2-mercapto)-propyl-sulfonic acid), and polymer nitrides (for example, gelatin) are used as organic additives. At this time, the additives may include 2 to 15 mg/L of HEC, 2 to 15 mg/L of (3-(Benzothiazolyl-2-mercapto)-propyl-sulfonic acid, and 5 to 20 mg/L of gelatin (2300 g/mole) which is a polymer nitride.

Meanwhile, in order to prepare an electrolytic copper foil for a lithium secondary battery according to a comparative example, a method different from the above is applied. In detail, a concentration of TOC, which is organic impurity in copper sulfate (50 to 100 g/L of copper and 50 to 150 g/L of sulfuric acid) used as an electrolyte during a foil preparing process, is greater than 1 g/L, or a current density applied for electrolytic deposition of the electrolytic copper foil is out of the range of 30 ASD to 80 ASD.

Detailed compositions of the electrolyte and electrolyzing conditions to prepare an electrolytic copper foil according to each of the examples and the comparative examples are as follows.

Copper: 75 g/L
Sulfuric acid: 100 g/L
Temperature of electrolyte: 55° C.
Current density: see Table 1
HEC: 10 mg/L
(3-(Benzothiazolyl-2-mercapto)-propyl-sulfonic acid: 10 mg/L
Gelatin (2300 g/mole): 15 mg/L
TOC concentration in the electrolyte: see Table 1

TABLE 1

|  | TOC (g/L) | current density (ASD) |
| --- | --- | --- |
| Example 1 | 0.7 | 40 |
| Example 2 | 0.8 | 40 |
| Example 3 | 0.9 | 50 |
| Example 4 | 0.3 | 60 |
| Example 5 | 0.5 | 60 |
| Example 6 | 0.7 | 70 |
| Example 7 | 0.3 | 50 |
| Example 8 | 0.9 | 60 |
| Example 9 | 0.3 | 70 |
| Comparative Example 1 | 1.2 | 30 |
| Comparative Example 2 | 1.5 | 40 |
| Comparative Example 3 | 1.7 | 40 |
| Comparative Example 4 | 2 | 50 |
| Comparative Example 5 | 0.5 | 90 |
| Comparative Example 6 | 0.7 | 20 |
| Comparative Example 7 | 1.2 | 40 |
| Comparative Example 8 | 1.1 | 40 |
| Comparative Example 9 | 1.8 | 50 |
| Comparative Example 10 | 0.3 | 85 |

For the electrolytic copper foils according to the examples and the comparative examples as shown in Table 1, it was checked whether the electrolytic copper foil prepared according to each of the examples and the comparative examples is disconnected or not along with the degree of workability during a battery manufacturing process, depending on ranges of an elongation, a breaking strength and a breaking strength ratio, as described below in detail.

Now, with reference to Table 2 below, effects depending on properties of copper foils after a thermal treatment will be investigated by comparing the electrolytic copper foils prepared according to the examples and the comparative examples. At this time, the electrolytic copper foil 1 prepared according to each of the examples and the comparative examples may have an anti-corrosion layer 2 formed on a surface 1a thereof, as shown in FIG. 2.

Evaluation of Electrolytic Copper Foil Workability

A negative electrode material was coated to an electrolytic copper foil and then dried at 300° C., and then made into a jelly roll by using a roll-to-roll battery manufacturing facility. During this process, workability of the electrolytic copper foil was evaluated, while setting a winding tension to be 160N at a linear speed of 5 to 10 mpm. When the electrolytic copper foil coated with the negative electrode material is wound as much as 1,000 m, if the electrolytic copper foil acquired wrinkles or was torn, the electrolytic copper foil was determined as having inferiority.

2 parts by weight of polyimide monomer and 2 parts by weight of carboxymethyl cellulose (CMC) were mixed on the basis of 100 parts by of silicon-carbon composite weight negative electrode material as a negative electrode active material, and made into slurry by using distilled water as a solvent. Also, the negative electrode material was coated on the electrolytic copper foil prepared according to each of the examples and the comparative examples and having a width of 20 cm and then dried, thereby preparing a cylindrical lithium secondary battery sample of 18650 standard.

After the cylindrical lithium secondary battery sample was prepared using the above process, a charging/discharging test was performed 200 times at 0.2 C, and then the lithium secondary battery was dissembled. Here, it was checked whether the copper foil coated with the negative electrode material is torn, and if the copper foil was torn, the copper foil was determined as having inferiority.

Conditions for measurement of elongation and breaking strength ratio UTM
Sample width: 12.7 mm
Distance between grips: 50 mm
Measurement speed: 50 mm/min
Thermal treatment condition: 300° C./30 minutes
Yield strength: yield strength was obtained after 0.2% offset at a SS curve Similarly, if Examples 4 to 6 and Comparative Examples 4 to 6 in Table 2 are compared with each other, it may be understood that inferiority does not occur at a product while the electrolytic copper foil is being manufactured, only when the electrolytic copper foil has an elongation of 30% or less after the thermal treatment.

Next, if Example 6 and Comparative Example 10 in Table 2 are compared with each other, it may be understood that inferiority does not occur at a product while the electrolytic copper foil is being manufactured, only when the electrolytic copper foil has a breaking strength of 19 kgf/mm$^2$ or above after the thermal treatment.

Similarly, if Example 7 and Comparative Example 9 in Table 2 are compared with each other, it may be understood that inferiority does not occur at a product while the electrolytic copper foil is being manufactured, only when the electrolytic copper foil has a breaking strength of 26 kgf/mm$^2$ or less after the thermal treatment.

Lastly, if Example 6 and Comparative Examples 6 to 8 in Table 2 are compared with each other, it may be understood that inferiority does not occur at a product while the electrolytic copper foil is being manufactured, only when the electrolytic copper foil has a breaking strength ratio of 165% or less after the thermal treatment (however, in a technical aspect, the breaking strength ratio cannot be lowered below 110% at the electrolytic copper foil to which a thermal treatment is applied at 300° C. for 30 minutes).

TABLE 2

| | elongation [%] | breaking strength [kgf/mm$^2$] | yield strength [kgf/mm$^2$] | breaking strength ratio [%] | workability | tear after charging/discharging |
|---|---|---|---|---|---|---|
| Example 1 | 5.2 | 19.2 | 16.3 | 118 | good | no |
| Example 2 | 5.1 | 19.4 | 14.4 | 135 | good | no |
| Example 3 | 29.2 | 20.4 | 17.3 | 118 | good | no |
| Example 4 | 29.5 | 20.3 | 15.0 | 135 | good | no |
| Example 5 | 29.7 | 19.7 | 12.0 | 164 | good | no |
| Example 6 | 5.2 | 25.9 | 21.9 | 118 | good | no |
| Example 7 | 8.4 | 24.2 | 15.2 | 159 | good | no |
| Example 8 | 29.2 | 25.9 | 21.9 | 118 | good | no |
| Example 9 | 29.5 | 25.3 | 18.7 | 135 | good | no |
| Comparative Example 1 | 4.8 | 25.9 | 21.9 | 118 | good | yes |
| Comparative Example 2 | 4.7 | 25.3 | 19.2 | 132 | good | yes |
| Comparative Example 3 | 4.7 | 24.7 | 15.8 | 156 | good | yes |
| Comparative Example 4 | 30.6 | 19.7 | 16.3 | 121 | wrinkle | not available |
| Comparative Example 5 | 30.9 | 19.2 | 14.2 | 135 | wrinkle | not available |
| Comparative Example 6 | 30.5 | 21 | 11.7 | 179 | wrinkle | not available |
| Comparative Example 7 | 5.4 | 25.5 | 15.3 | 166 | wrinkle | not available |
| Comparative Example 8 | 29.7 | 19.2 | 11.4 | 169 | wrinkle | not available |
| Comparative Example 9 | 6 | 26.3 | 22.3 | 118 | wrinkle | not available |
| Comparative Example 10 | 29.3 | 18.7 | 11.4 | 164 | torn | not available |

If Examples 1 to 3 and Comparative Examples 1 to 3 in Table 2 are compared with each other, it may be understood that inferiority does not occur at a product while the electrolytic copper foil is being manufactured or while the manufactured secondary battery is being charged or discharged, only when the electrolytic copper foil has an elongation of 5% or above after the thermal treatment.

Therefore, if the above results are synthetically put into consideration, it may be understood that the electrolytic copper foil for a lithium secondary battery may have excellent quality suitable for making a lithium secondary battery when the electrolytic copper foil has an elongation in the range of about 5% to 30%, a breaking strength in the range of about 19 kgf/mm$^2$ to 26 kgf/mm$^2$ and a breaking strength ratio in the range of about 110% to 165%, after thermal treatment is applied thereto at about 300°.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure provides an electrolytic copper foil for a lithium secondary battery, which is used for a negative electrode current collector applied to a lithium secondary battery, and a lithium secondary battery comprising the same.

What is claimed is:

1. An electrolytic copper foil for a lithium secondary battery, which is applied as a negative electrode current collector of a lithium secondary battery,
wherein after a thermal treatment at 300° C. for 30 minutes, the electrolytic copper foil for a lithium secondary battery would have an elongation of 5% to 30%, a breaking strength of 19 kgf/mm$^2$ to 26 kgf/mm$^2$, and a breaking strength ratio ((breaking strength/yield strength)×100) of 110% to 165%.

2. The electrolytic copper foil for a lithium secondary battery according to claim 1,
wherein the electrolytic copper foil for a lithium secondary battery has an anti-corrosion layer containing at least one of chrome (Cr), silane compound and nitride compound, on both surfaces thereof.

3. The electrolytic copper foil for a lithium secondary battery according to claim 1,
wherein the electrolytic copper foil for a lithium secondary battery has a thickness of 3 μm to 30 μm.

4. The electrolytic copper foil for a lithium secondary battery according to claim 1,
wherein both surfaces of the electrolytic copper foil for a lithium secondary battery have a surface roughness of 3.5 μm or less on the basis of Rz.

5. A lithium secondary battery, to which the electrolytic copper foil for a lithium secondary battery according to claim 1 is applied as a negative electrode current collector.

* * * * *